United States Patent
Zhang et al.

(10) Patent No.: US 11,535,743 B2
(45) Date of Patent: Dec. 27, 2022

(54) THERMOPLASTIC COMPOUNDS BONDABLE TO RIGID SUBSTRATES

(71) Applicant: Avient Corporation, Avon Lake, OH (US)

(72) Inventors: Haiping Zhang, Gaggenau (DE); Dirk Von Falkenhayn, Von Falkenhayn (DE)

(73) Assignee: Avient Corporation, Avon Lake, OH (US)

( * ) Notice: Subject to any disclaimer, the term of this patent is extended or adjusted under 35 U.S.C. 154(b) by 102 days.

(21) Appl. No.: 16/978,367

(22) PCT Filed: Mar. 5, 2019

(86) PCT No.: PCT/US2019/020698
§ 371 (c)(1),
(2) Date: Sep. 4, 2020

(87) PCT Pub. No.: WO2019/173299
PCT Pub. Date: Sep. 12, 2019

(65) Prior Publication Data
US 2021/0040307 A1    Feb. 11, 2021

Related U.S. Application Data

(60) Provisional application No. 62/639,748, filed on Mar. 7, 2018.

(51) Int. Cl.
| | | |
|---|---|---|
| *C08L 53/02* | (2006.01) | |
| *B29C 45/14* | (2006.01) | |
| *C08L 23/12* | (2006.01) | |
| *C08L 23/26* | (2006.01) | |

(52) U.S. Cl.
CPC ........ *C08L 53/02* (2013.01); *B29C 45/14475* (2013.01); *C08L 23/12* (2013.01); *C08L 23/26* (2013.01); *C08L 2205/03* (2013.01); *C08L 2207/04* (2013.01)

(58) Field of Classification Search
CPC .............................. C08L 23/12; C08L 2205/03
See application file for complete search history.

(56) References Cited

U.S. PATENT DOCUMENTS

| 4,957,968 A * | 9/1990 | Adur ....................... C08L 21/00 |
| | | 525/76 |
| 2005/0148727 A1* | 7/2005 | Ajbani .................. C08L 53/005 |
| | | 525/63 |
| 2005/0260394 A1* | 11/2005 | Ajbani .................... C08L 71/12 |
| | | 264/279.1 |
| 2010/0015236 A1 | 1/2010 | Magdassi et al. |
| 2011/0178198 A1* | 7/2011 | Backer .................. C08F 255/00 |
| | | 521/149 |
| 2011/0305886 A1* | 12/2011 | Phan ....................... C08L 57/02 |
| | | 524/505 |
| 2014/0128527 A1* | 5/2014 | de Boer .................. C08L 53/02 |
| | | 524/505 |
| 2014/0163154 A1* | 6/2014 | Shipley ................... C08L 53/02 |
| | | 524/505 |
| 2014/0272370 A1 | 9/2014 | Broyles et al. |
| 2014/0288225 A1* | 9/2014 | Shipley ................. C08L 53/025 |
| | | 524/451 |
| 2015/0016755 A1* | 1/2015 | Sheikh ............... B29D 99/0096 |
| | | 264/255 |
| 2015/0166776 A1* | 6/2015 | Kock ...................... C08L 23/16 |
| | | 524/151 |
| 2016/0167347 A1* | 6/2016 | Jung ....................... B32B 7/027 |
| | | 428/323 |
| 2016/0289566 A1* | 10/2016 | Eric-Carl .............. C07C 321/28 |
| 2017/0226321 A1* | 8/2017 | Bonekamp ............. C08K 5/101 |
| 2019/0144651 A1* | 5/2019 | Matsuda ................... B29B 9/14 |
| | | 524/528 |
| 2019/0185649 A1* | 6/2019 | Ni ............................... C08J 5/18 |
| 2020/0369865 A1* | 11/2020 | Iwasa ....................... C08K 5/13 |
| 2021/0054180 A1* | 2/2021 | Toltsch ................ C08K 5/0083 |

FOREIGN PATENT DOCUMENTS

| CN | 101033325 A | 9/2007 |
| CN | 103819817 A | 5/2014 |
| EP | 3168024 A1 | 5/2017 |
| EP | 3666823 A1 | 6/2020 |
| JP | 2009249489 A | 10/2009 |

* cited by examiner

*Primary Examiner* — Mark S Kaucher
(74) *Attorney, Agent, or Firm* — David V. Monateri; Emily E. Vlasek; Michael J. Sambrook

(57) ABSTRACT

Thermoplastic compounds include elastomer, modified polyolefin polymer including a polar functional group, and unmodified polyolefin polymer. The melt flow rate of the modified polyolefin polymer is greater than the melt flow rate of the unmodified polyolefin polymer. The thermoplastic compounds exhibit excellent bonding when overmolded onto rigid substrates such as metals, while also providing desirable aesthetic properties and good processability.

19 Claims, No Drawings

THERMOPLASTIC COMPOUNDS BONDABLE TO RIGID SUBSTRATES

CLAIM OF PRIORITY

This application claims priority from U.S. Provisional Patent Application Ser. No. 62/639,748, filed on Mar. 7, 2018, which is incorporated by reference in its entirety.

FIELD OF THE INVENTION

This invention relates to thermoplastic compounds and molded articles made from thermoplastic compounds. More particularly, this invention relates to thermoplastic compounds that exhibit excellent bonding when overmolded onto rigid substrates such as metals.

BACKGROUND OF THE INVENTION

Demand exists for overmolded thermoplastic articles in a variety of markets and product applications. Non-limiting examples include consumer products, electronics and accessories, automotive and transportation, building and construction, and healthcare and medical. Often, overmolding is used to provide products or parts with a combination of enhanced functionality and improved aesthetics.

Generally, overmolding is an injection molding process whereby one material (an overmold material) such as an elastomeric thermoplastic material is molded onto another material (a substrate material) such as a rigid thermoplastic material to provide a single product or part comprised of multiple components. When the overmold material and the substrate material are properly selected, the overmold material forms a strong bond with the substrate material without the need for primers or adhesives.

Insert molding is a variation of overmolding that also involves molding an overmold material onto a substrate material, but the substrate material is typically a pre-made or pre-machined part, or insert, made of metal or another rigid material. The insert is placed into the mold and the overmold material is molded over it. To achieve strong bonding between the overmold material and the insert, proper preparation (e.g., cleaning, drying, preheating, etc.) of the insert can be important. Additionally, the type of overmold material that is utilized also can affect the strength and quality of the bonding with the insert.

However, utilizing conventional thermoplastic materials as the overmold material for insert molding can involve undesirable tradeoffs. For example, thermoplastic materials that can provide good bonding to metal inserts can lack desirable aesthetics or good processability. Likewise, thermoplastic materials that can provide desirable aesthetics and good processability can lack good bonding to metal inserts.

SUMMARY OF THE INVENTION

Consequently, a need exists for thermoplastic compounds that exhibit excellent bonding when overmolded onto rigid substrates such as metals while also providing desirable aesthetic properties (e.g., good touch and feel without tackiness or stickiness; matte surface appearance, etc.) for the overmold part and while further exhibiting good processability (e.g., short cycle times; minimized processing temperatures; etc.).

The aforementioned needs are met by one or more aspects of the present invention.

In some aspects, the present invention is directed to thermoplastic compounds that include elastomer, modified polyolefin polymer including a polar functional group, and unmodified polyolefin polymer. The Melt Flow Rate of the modified polyolefin polymer is greater than the Melt Flow Rate of the unmodified polyolefin polymer.

In other aspects, the present invention is directed to molded articles that include a rigid substrate part and an overmold part molded from a thermoplastic compound as described herein. The overmold part is bonded to at least a portion of the rigid substrate part at a bond interface.

In further aspects, the present invention is directed to methods of making molded articles as described herein. The methods include the steps of: (a) providing the rigid substrate part; (b) providing the thermoplastic compound of the present invention as described herein; and (c) molding the thermoplastic compound to provide the overmold part, wherein the overmold part is bonded to at least a portion of the rigid substrate part at a bond interface, thereby providing the molded article.

Features of the invention will become apparent with reference to the following embodiments. There exist various refinements of the features noted in relation to the above-mentioned aspects of the present invention. Additional features may also be incorporated in the above-mentioned aspects of the present invention. These refinements and additional features may exist individually or in any combination. For instance, various features discussed below in relation to any of the described aspects of the present invention may be incorporated into any of the described aspects of the present invention alone or in any combination.

EMBODIMENTS OF THE INVENTION

In some embodiments, the invention is directed to thermoplastic compounds. In other embodiments, the invention is directed to molded articles made from thermoplastic compounds. In further embodiments, the invention is directed to methods of making molded articles. Required and optional features of these and other embodiments of the present invention are described.

As used herein, the term "compound" means a composition or mixture resulting from melt mixing, or compounding, a neat polymer and at least one other ingredient including but not limited to one or more additives, or one or more other polymers, or both.

As used herein, the term "free of" a certain component or substance means, in some embodiments, that no amount of that component or substance is intentionally present, and, in other embodiments, that no functionally effective amount of that component or substance is present, and, in further embodiments, that no amount of that component or substance is present.

As used herein, the term "Melt Flow Rate" means a melt flow rate according to ISO 1133 at specified testing conditions. It is to be understood that ISO 1133 corresponds to ASTM D1238, which yields substantially equivalent results.

As used herein, the term "Melt Flow Rate (190° C., 2.16 kg)" means a Melt Flow Rate at testing conditions of a temperature of 190° C. and a gravimetric weight of 2.16 kg.

As used herein, the term "Melt Flow Rate (230° C., 2.16 kg)" means a Melt Flow Rate at testing conditions of a temperature of 230° C. and a gravimetric weight of 2.16 kg. It is to be understood that the Melt Flow Rate (230° C., 2.16 kg) of a thermoplastic material typically will be higher than the Melt Flow Rate (190° C., 2.16 kg) of the same thermoplastic material.

As used herein, the terms "molded from" or "molding" mean, with respect to an article (or a part of an article) and a material (e.g., a compound), that the article (or the part of the article) is molded, extruded, shaped, formed, or otherwise made from the material (e.g., the compound). As such, the term "molded from" or "molding" mean, in some embodiments, the article (or the part of the article) can comprise, consist essentially of, or consist of, the material (e.g., the compound); and, in other embodiments, the article (or the part of the article) consists of the material (e.g., the compound) because the article (or the part of the article) is, for example, made by an injection molding process (including as part of an insert molding process).

Thermoplastic Compound

Some aspects of the invention are directed to thermoplastic compounds.

According to the invention, thermoplastic compounds include elastomer, modified polyolefin polymer including a polar functional group, and unmodified polyolefin polymer. The Melt Flow Rate (at specified testing conditions) of the modified polyolefin polymer is greater than the Melt Flow Rate (at the same specified testing conditions) of the unmodified polyolefin polymer.

In some embodiments, thermoplastic compounds include a combination of two or more different types of modified polyolefin polymer and/or a combination of two or more different types of unmodified polyolefin polymer, and the Melt Flow Rate (at specified testing conditions) for the combination of the different types of the modified polyolefin polymers present in the thermoplastic compound is greater than the Melt Flow Rate (at the same specified testing conditions) for the combination of the different types of unmodified polyolefin polymers present in the thermoplastic compound. Further, in such embodiments, it is understood that the aforementioned requirement can be satisfied even if the Melt Flow Rate (at specified testing conditions) for each one of the combination of the different types of the modified polyolefin polymers present in the thermoplastic compound is not greater than the Melt Flow (at the same specified testing conditions) for each one of the combination of the different types of unmodified polyolefin polymers present in the thermoplastic compound.

Elastomer

According to the invention, thermoplastic compounds include elastomer.

Elastomers, which generally include any polymer that displays rubber-like elasticity, can be used to modify certain properties of the thermoplastic compound such as impact strength and hardness. Those skilled in the art of thermoplastics compounding, without undue experimentation, can select suitable elastomers to achieve desirable values for impact strength, hardness, and other properties.

Suitable elastomers include conventional or commercially available elastomers. Suitable elastomers also include thermosets or thermoplastics. Suitable elastomers further include synthetic rubbers or natural rubbers. An elastomer can be used alone or in combination with one or more other elastomers.

Non-limiting examples of elastomers suitable for use in the present invention include unsaturated rubbers such as natural rubbers, isoprene rubbers, butadiene rubbers, chloroprene rubbers, butyl rubbers, styrene-butadiene rubbers, nitrile rubbers, and the like.

Other non-limiting examples of elastomers suitable for use in the present invention include saturated rubbers such as ethylene propylene rubbers (EPM), ethylene propylene diene rubbers (EPDM), silicone rubbers, and the like.

Further non-limiting examples of elastomers suitable for use in the present invention include thermoplastic elastomers such as styrenic block copolymers (SBC), thermoplastic vulcanizates (TPV), thermoplastic polyolefins (TPO), copolyesters (COPE), thermoplastic polyurethanes (TPU), copolyamides (COPA), olefin block copolymers (OBC), and the like.

In some embodiments, the thermoplastic elastomer is styrenic block copolymer (SBC) selected from styrene-ethylene/butylene-styrene (SEBS) block copolymer, styrene-ethylene/propylene-styrene (SEPS) block copolymer, styrene-ethylene/ethylene/propylene-styrene (SEEPS) block copolymer, styrene-isobutylene-styrene (SIBS) block copolymer, styrene-butadiene-styrene (SBS) block copolymer, styrene-isoprene-styrene (SIS) block copolymer, and combinations thereof.

In some embodiments, the thermoplastic elastomer is styrene-ethylene/butyl ene-styrene (SEBS) block copolymer.

Non-limiting examples of commercial available thermoplastic elastomers include those available under the KRATON brand from Kraton Polymers such as grades G1651ES and G1642HU.

In some embodiments, thermoplastic compounds of the present invention are relatively hard, for example, having a Shore D hardness from about 10 to about 90, or, from about 40 to about 70, or greater than about 50.

In other embodiments, thermoplastic compounds of the present invention are relatively soft, for example, having a Shore A hardness from about 10 to about 60, or, less than about 40.

Modified Polyolefin Polymer

According to the invention, thermoplastic compounds include modified polyolefin polymer. The modified polyolefin polymer includes a polar functional group.

As used herein, the term "modified" when used in reference to polyolefin polymer means that the polyolefin polymer includes a polar functional group.

Suitable modified polyolefin polymer include conventional or commercially available modified polyolefin polymers. A modified polyolefin polymer can be used alone or in combination with one or more other modified polyolefin polymers.

In some embodiments, the modified polyolefin polymer is polypropylene homopolymer modified to include the polar functional group.

In other embodiments, the modified polyolefin polymer is polypropylene copolymer modified to include the polar functional group. Suitable polypropylene copolymer includes copolymer of propylene with one or more alpha-olefins such as ethylene, 1-butene, 1-pentene, 1-hexene, 1-octene, 4-methyl-1-pentene, and cyclohexene.

In some embodiments, the polar functional group of the modified polyolefin polymer includes carboxylic acid or its ester or its anhydride.

In some embodiments, the polar functional group of the modified polyolefin polymer includes maleic acid or maleic anhydride.

In some embodiments, the modified polyolefin polymer is maleic anhydride modified polypropylene.

According to the invention, the Melt Flow Rate (at specified testing conditions) of the modified polyolefin polymer is greater than the Melt Flow Rate (at the same specified testing conditions) of the unmodified polyolefin polymer. In such cases, it is possible to achieve improved and excellent adhesion between a rigid substrate part such as a metal insert and an overmold part molded from the thermoplastic compound, while also achieving desirable aesthetic properties (e.g., good touch and feel without tackiness or stickiness; matte surface appearance, etc.) for the overmold part, while further achieving good processability (e.g., short cycle times) of the thermoplastic compound.

While not intending to be limited by theory, it is believed that when the Melt Flow Rate (at specified testing conditions) of the modified polyolefin polymer is greater than the Melt Flow Rate (at the same specified testing conditions) of the unmodified polyolefin polymer, it is possible during the molding process for relatively higher amounts of the modified polyolefin polymer to flow to the surface of the rigid substrate (i.e., at the bond interface). With relatively higher amounts of the modified polyolefin polymer at the surface of the rigid substrate, excellent bonding can be achieved.

In some embodiments, a ratio of the Melt Flow Rate of the modified polyolefin polymer relative to the Melt Flow Rate of the unmodified polyolefin polymer is at least about 2:1. That is, in some embodiments, a ratio of the Melt Flow Rate (230° C., 2.16 kg) of the modified polyolefin polymer relative to the Melt Flow Rate (230° C., 2.16 kg) of the unmodified polyolefin polymer is at least about 2:1; and, in other embodiments, a ratio of the Melt Flow Rate (190° C., 2.16 kg) of the modified polyolefin polymer relative to the Melt Flow Rate (190° C., 2.16 kg) of the unmodified polyolefin polymer is at least about 2:1.

In some embodiments, the modified polyolefin polymer has a Melt Flow Rate (230° C., 2.16 kg) of at least about 50 g/10 min.

In other embodiments, the modified polyolefin polymer has a Melt Flow Rate (230° C., 2.16 kg) of at least about 100 g/10 min.

In further embodiments, the modified polyolefin polymer has a Melt Flow Rate (190° C., 2.16 kg) of at least about 100 g/10 min.

Non-limiting examples of commercial available modified polyolefin polymers include those available under the BONDYRAM brand from Polyram Plastic Industries such as grade 1001.

Unmodified Polyolefin Polymer

According to the invention, thermoplastic compounds include unmodified polyolefin polymer.

As used herein, the term "unmodified" when used in reference to polyolefin polymer means that the polyolefin polymer does not include a polar functional group like the modified polyolefin polymer.

According to the invention, the Melt Flow Rate (at specified testing conditions) of the modified polyolefin polymer is greater than the Melt Flow Rate (at the same specified testing conditions) of the unmodified polyolefin polymer.

Suitable unmodified polyolefin polymer include conventional or commercially available unmodified polyolefin polymers that have a Melt Flow Rate (at specified testing conditions) that is lower than the Melt Flow Rate (at the same specified testing conditions) of the modified polyolefin polymer. An unmodified polyolefin polymer can be used alone or in combination with one or more other unmodified polyolefin polymers.

In some embodiments, the unmodified polyolefin polymer is polypropylene homopolymer.

In other embodiments, the unmodified polyolefin polymer is polypropylene copolymer. Suitable polypropylene copolymer includes copolymer of propylene with one or more alpha-olefins such as ethylene, 1-butene, 1-pentene, 1-hexene, 1-octene, 4-methyl-1-pentene, and cyclohexene.

Non-limiting examples of commercial available unmodified polyolefin polymers include those available under the INEOS brand from INEOS such as grades 100-CA50S and 100-GB06; those available under the BORPURE brand from Borealis such as grade RJ377MO.

Optional Additives

In some embodiments, the thermoplastic compound includes one or more optional additives.

Suitable optional additive include conventional or commercially available plastics additives. Those skilled in the art of thermoplastics compounding, without undue experimentation, can select suitable additives from available references, for example, E. W. Flick, "Plastics Additives Database," *Plastics Design Library* (Elsevier 2004).

Optional additives can be used in any amount that is sufficient to obtain a desired processing or performance property for the thermoplastic compound and/or the molded article. The amount should not be wasteful of the additive nor detrimental to the processing or performance of the thermoplastic compound and/or the molded article.

Non-limiting examples of additives suitable for use in the present invention include one or more selected from antioxidants; colorants; fillers; plasticizers; release agents; and ultraviolet light absorbers.

In some embodiments, the thermoplastic compound includes one or more of antioxidants, fillers, and plasticizers.

In some embodiments, the thermoplastic compound is free of tackifier resin.

Ranges of Ingredients in the Thermoplastic Compounds

Table 1 below shows the acceptable, desirable, and preferable ranges of ingredients for various embodiments of the thermoplastic compounds of the present invention in terms of weight percent based on total weight of the thermoplastic compound. Other possible ranges of ingredients for certain embodiments of the present invention are as described elsewhere herein.

Thermoplastic compounds of the present invention can comprise, consist essentially of, or consist of these ingredients. Any number between the ends of the ranges is also contemplated as an end of a range, such that all possible combinations are contemplated within the possibilities of Table 1 as embodiments of compounds for use in the present invention. Unless expressly stated otherwise herein, any disclosed number is intended to refer to both exactly the disclosed number and "about" the disclosed number, such that either possibility is contemplated within the possibilities of Table 1 as embodiments of compounds for use in the present invention.

TABLE 1

| Thermoplastic Compound (wt. %) | | | |
|---|---|---|---|
| Ingredient | Acceptable | Desirable | Preferable |
| Elastomer | 1 to 30 | 5 to 25 | 10 to 20 |
| Modified Polyolefin Polymer | 5 to 50 | 10 to 40 | 15 to 30 |
| Unmodified Polyolefin Polymer | 10 to 90 | 35 to 85 | 50 to 75 |
| Optional Plasticizer | 0 to 30 | 0 to 25 | 0 to 15 |
| Optional Filler | 0 to 10 | 0 to 8 | 0 to 6 |
| Optional Antioxidant | 0 to 2 | 0 to 1.5 | 0 to 1 |

In some embodiments, the modified polyolefin polymer is present in an amount relative to an amount of the elastomer at a weight ratio of at least about 1.25:1.

In other embodiments, the modified polyolefin polymer is present in an amount relative to an amount of the elastomer at a weight ratio of at least about 1.66:1.

Processing

Preparation of the thermoplastic resin compounds and the thermoplastic elastomer compounds of the present invention is uncomplicated once the proper ingredients have been selected. The compounds can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 200 to about 700 revolutions per minute (rpm), and preferably from about 300 rpm to about 500 rpm. Typically, the output from the extruder is pelletized for later processing.

Subsequent preparation of articles of the present invention by overmolding or insert molding processes also is uncomplicated once thermoplastic compounds of the present invention are provided.

Overmolding and insert molding processes are described in available references, for example, Jin Kuk Kim et al. (editors), *Multicomponent Polymeric Materials* (Springer 2016); Dominick V. Rosato et al., *Plastics Design Handbook* (Springer 2013); GLS Corporation, *Overmolding Guide* (2004).

Molded Articles

Some aspects of the invention are directed to molded articles.

According to the invention, molded articles include a rigid substrate part and an overmold part molded from a thermoplastic compound as described herein. The overmold part is bonded to at least a portion of the rigid substrate part at a bond interface. The bond interface is free of adhesive.

In some embodiments, the bond interface is without any gap between the overmold part and the portion of the rigid substrate part. That is, in some embodiments, the bond interface is without any gap or physical space sufficient to allow a liquid such as water or blood to flow (e.g., by capillary action) between the overmold part and the portion of the rigid substrate part.

In some embodiments, the rigid substrate part includes a material selected from metals, ceramics, glasses, and thermoplastic resins.

In other embodiments, the rigid substrate part includes metal selected from aluminum cooper, steel, stainless steel, titanium, and alloys thereof.

In some embodiments, the article is an item of cutlery. Cutlery can include, for example, knives, forks, spoons, flatware, and other utensils or tools for cooking, serving, or eating. Cutlery also can include, for example, knives, scissors, shears, blades, saws, and other instruments or tools for cutting.

Methods of Making Molded Articles

Some aspects of the invention are directed to methods of making a molded article having a rigid substrate part and an overmold part.

According to the invention, the method includes the steps of: (a) providing the rigid substrate part; (b) providing the thermoplastic compound of the present invention as described herein; and (c) molding the thermoplastic compound to provide the overmold part, wherein the overmold part is bonded to at least a portion of the rigid substrate part at a bond interface, thereby providing the molded article.

In some embodiments, the molding of step (c) occurs such that the overmold part surrounds the portion of the rigid substrate part.

Molded articles made according to the methods described herein can include any combination of the features described herein for the molded articles of the present invention.

Usefulness of the Invention

Thermoplastic compounds of the present invention are useful for making molded articles. Such molded articles can include a rigid substrate part and an overmold part molded from the thermoplastic compound. According to aspects of the invention, it is possible to achieve improved and excellent bonding between the rigid substrate part such as a metal insert and the overmold part, while also achieving desirable aesthetic properties (e.g., good touch and feel without tackiness or stickiness; matte surface appearance; etc.) for the overmold part, while further achieving good processability (e.g., short cycle times) of the thermoplastic compound.

Thermoplastic compounds of the present invention and molded articles made therefrom have potential for a variety of applications in many different industries. As described above, in some embodiments, the molded article is an item of cutlery. Cutlery can include, for example, knives, forks, spoons, flatware, and other utensils or tools for cooking, serving, or eating. Cutlery also can include, for example, knives, scissors, shears, blades, saws, and other instruments or tools for cutting. Additional applications are possible in other industries including but not limited to: automotive; building and construction; consumer products; healthcare and medical; household appliances; sporting equipment; and other industries or applications benefiting from the unique combination of properties of the thermoplastic compounds and molded articles made therefrom.

EXAMPLES

Non-limiting examples of thermoplastic elastomer compounds of various embodiments of the present invention are provided.

Table 2 below shows sources of ingredients for the thermoplastic compounds of Examples 1 to 3 and Comparative Example A.

TABLE 2

| Ingredient Description | Brand | Source |
|---|---|---|
| Polypropylene homopolymer | INEOS 100-CA50S | Ineos |
| Polypropylene homopolymer | INEOS 100-GB06 | Ineos |
| Polypropylene homopolymer | BORMOD HF955MO | Borealis |
| Polypropylene homopolymer | BORFLOW HL512FB | Borealis |
| Polypropylene copolymer | BORPURE RJ377MO | Borealis |
| Maleic anhydride modified polypropylene | BONDYRAM 1001 | Polyram |
| Maleic anhydride modified polypropylene | POLYBOND 3200 | Chemtura |
| Styrene-ethylene/butylene-styrene block copolymer | KRATON G 1651 ES | Kraton |
| Styrene-ethylene/butylene-styrene block copolymer | KRATON G 1642 HU | Kraton |
| Mineral oil | PIONIER M1930 | Hansen & Rosenthal |
| Hollow glass beads | SPHERICEL 60P18 | Potters |
| Talc | STEAMIC OOS F | Rio Tinto |
| Antioxidant | IRGANOX 1010 | BASF |
| Heat stabilizer | IRGANOX PS800 | BASF |

Table 3 below shows the Melt Flow Rate as reported by the manufacturer for each of the brands or commercial grades of modified polyolefin polymers and unmodified polyolefin polymers used as ingredients for the thermoplastic compounds of Examples 1 to 3 and Comparative Example A.

TABLE 3

| Brand | Melt Flow Rate (g/10 min) | Conditions | Method |
|---|---|---|---|
| INEOS 100-CA50S | 50 | 230° C./2.16 kg | ISO 1133 |
| INEOS 100-GB06 | 6 | 230° C./2.16 kg | ISO 1133 |
| BORMOD HF955MO | 20 | 230° C./2.16 kg | ISO 1133 |
| BORFLOW HL512FB | 1200 | 230° C./2.16 kg | ISO 1133 |
| BORPURE RJ377MO | 45 | 230° C./2.16 kg | ISO 1133 |
| BONDYRAM 1001 | 100 | 190° C./2.16 kg | ISO 1133 |
| POLYBOND 3200 | 115 | 190° C./2.16 kg | ASTM D1238 |

Examples of the thermoplastic compound were compounded and extruded as pellets on a twin extruder at a temperature of 180-200° C. and a mixing speed of 400 rpm. Subsequently, test specimens were prepared by injection molding and then evaluated for the reported properties.

Table 4 below shows the formulations and certain properties of Examples 1 to 3 and Comparative Example A.

TABLE 4

| | Example | | | |
|---|---|---|---|---|
| | A | 1 | 2 | 3 |
| | Weight Percent (wt. %) | | | |
| Ingredient | | | | |
| INEOS 100-CA50S | | | 41.7 | 30.4 |
| INEOS 100-GB06 | | 30.4 | | |
| BORMOD HF955MO | 21.9 | | | |
| BORFLOW HL512FB | 24.8 | | | |
| BORPURE RJ377MO | | 28 | | 28 |
| BONDYRAM 1001 | | 20 | 20 | 20 |
| POLYBOND 3200 | 19.9 | | | |
| KRATON G 1651 ES | | | | 12 |
| KRATON G 1642 HU | 19.9 | 12 | 19.7 | |
| PIONIER M1930 | 9.9 | 4 | 10 | 4 |
| SPHERICEL 60P18 | 3 | | 3 | |
| STEAMIC OOS F | | 5 | 5 | 5 |
| IRGANOX 1010 | 0.2 | 0.2 | 0.2 | 0.2 |
| IRGANOX PS800 | 0.4 | 0.4 | 0.4 | 0.4 |
| TOTAL | 100 | 100 | 100 | 100 |
| Properties | | | | |
| Specific gravity (g/cm3) (ISO 1183) | 0.90 | 0.94 | 0.93 | 0.94 |
| Hardness (Shore D) (ISO7619-1) | 52.0 | 57.0 | 51.0 | 59.5 |
| Apparent viscosity at 67.023/s (Pa-sec) (ISO 11443) | 98.3 | 364.5 | 318.8 | 410.4 |
| Apparent viscosity at 1340.5/s (Pa-sec) (ISO 11443) | 32.6 | 70.7 | 68.3 | 78.6 |
| Apparent viscosity at 67023/s (Pa-sec) (ISO 11443) | 3.2 | 6.2 | 5.5 | 5.9 |
| Unnotched impact strength, charpy (30° C.) (kJ/m$^2$) (ISO 179) | 93.37 | 52.57 | 61.74 | 32.42 |
| Notched impact strength, charpy (23° C.) (kJ/m$^2$) (ISO 179) | 36.19 | 18.39 | 49.98 | 6.09 |
| Bonding of overmold to metal insert (qualitative observations) | Overmold fully removed from metal insert by mechanical treatment with blade | Overmold not fully removed from metal insert by mechanical treatment with blade | Overmold not fully removed from metal insert by mechanical treatment with blade | Overmold not fully removed from metal insert by mechanical treatment with blade |

Without undue experimentation, those having ordinary skill in the art can utilize the written description, including the Examples, to make and use thermoplastic compounds and molded articles according to the present invention.

All documents cited in the Embodiments of the Invention are incorporated herein by reference in their entirety unless otherwise specified. The citation of any document is not to be construed as an admission that it is prior art with respect to the present invention.

While particular embodiments of the present invention have been described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. A thermoplastic compound comprising:
    (a) from about 1 to about 30 weight percent, by weight of the thermoplastic compound, of an elastomer;
    (b) from about 10 to about 50 weight percent, by weight of the thermoplastic compound, of a modified polyolefin polymer comprising a polar functional group; and
    (c) from about 10 to about 90 weight percent, by weight of the thermoplastic compound, of an unmodified polyolefin polymer;
    wherein the unmodified polyolefin polymer is selected from polypropylene homopolymer, polypropylene copolymer, and combinations thereof;
    wherein the modified polyolefin polymer includes one type or multiple types of modified polyolefin polymer and the unmodified polyolefin polymer includes one type or multiple types of unmodified polyolefin polymer; and
    wherein each type of the modified polyolefin polymer and each type of the unmodified polyolefin polymer has a Melt Flow Rate;
    wherein the one type of modified polyolefin polymer or a combination of the multiple types of modified polyolefin polymer has a Melt Flow Rate (190° C., 2.16 kg) of at least about 100 g/10 min; and
    wherein the Melt Flow Rate for the one type of modified polyolefin polymer or the combination of the multiple types of modified polyolefin polymers present in the thermoplastic compound is greater than the Melt Flow Rate for the one type of unmodified polyolefin polymer or the combination of the multiple types of unmodified polyolefin polymers present in the thermoplastic compound.

2. The thermoplastic compound of claim 1, wherein the one type of unmodified polyolefin polymer or the combination of the multiple types of unmodified polyolefin polymer has a Melt Flow Rate (230° C., 2.16 kg) of less than about 50 g/10 min.

3. The thermoplastic compound of claim 1, wherein a ratio of the Melt Flow Rate (230° C., 2.16 kg) for the one type of modified polyolefin polymer or the combination of the multiple types of modified polyolefin polymers relative to the Melt Flow Rate (230° C., 2.16 kg) for the one type of unmodified polyolefin polymer or the combination of the multiple types of unmodified polyolefin polymers is at least about 2:1.

4. The thermoplastic compound of claim 1, wherein the elastomer is a thermoplastic elastomer selected from the group consisting of styrenic block copolymers (SBC), thermoplastic vulcanizates (TPV), thermoplastic polyolefins (TPO), copolyesters (COPE), thermoplastic polyurethanes (TPU), copolyamides (COPA), olefin block copolymers (OBC), and combinations thereof.

5. The thermoplastic compound of claim 1, wherein the elastomer is a styrenic block copolymer (SBC) selected from the group consisting of styrene-ethylene/butylene-styrene (SEBS) block copolymer, styrene-ethylene/propylene-styrene (SEPS) block copolymer, styrene-ethylene/ethylene/propylene-styrene (SEEPS) block copolymer, styrene-isobutylene-styrene (SIBS) block copolymer, styrene-butadiene-styrene (SBS) block copolymer, styrene-isoprene-styrene (SIS) block copolymer, and combinations thereof.

6. The thermoplastic compound of claim 1, wherein the polar functional group of the modified polyolefin polymer comprises carboxylic acid or its ester or its anhydride.

7. The thermoplastic compound of claim 1, wherein the polar functional group of the modified polyolefin polymer comprises maleic acid or maleic anhydride.

8. The thermoplastic compound of claim 1, wherein the modified polyolefin polymer is maleic anhydride modified polypropylene.

9. The thermoplastic compound of claim 1, further comprising one or more additives selected from the group consisting of antioxidants; colorants; fillers; plasticizers; release agents; ultraviolet light absorbers; and combinations thereof.

10. The thermoplastic compound of claim 1, wherein the thermoplastic compound comprises:
    (d) from 0 to about 30 weight percent, by weight of the thermoplastic compound, of plasticizer;
    (e) from 0 to about 10 weight percent, by weight of the thermoplastic compound, of filler;
    from 0 to about 2 weight percent, by weight of the thermoplastic compound, of antioxidant.

11. The thermoplastic compound of claim 1, wherein the modified polyolefin polymer is present in an amount relative to an amount of the elastomer at a weight ratio of at least about 1.25:1.

12. A molded article comprising:
    (a) a rigid substrate part; and
    (b) an overmold part molded from the thermoplastic compound of claim 1, wherein the overmold part is bonded to at least a portion of the rigid substrate part at a bond interface.

13. The molded article of claim 12, wherein the overmold part surrounds the portion of the rigid substrate part.

14. The molded article of claim 12, wherein the bond interface is without any gap between the overmold part and the portion of the substrate part.

15. The molded article of claim 12, wherein the rigid substrate part comprises a material selected from the group consisting of metals, ceramics, glasses, and thermoplastic resins.

16. A method of making a molded article having a rigid substrate part and an overmold part, the method comprising the steps of:
    (a) providing the rigid substrate part;
    (b) providing the compound of claim 1;
    (c) molding the compound to provide the overmold part, wherein the overmold part is bonded to at least a portion of the rigid substrate part at a bond interface, thereby providing the molded article.

17. The method of claim 16, wherein the molding of step (c) occurs such that the overmold part surrounds the portion of the rigid substrate part.

18. The thermoplastic compound of claim 1, wherein from about 10 to about 40 weight percent, by weight of the thermoplastic compound, is the modified polyolefin polymer comprising a polar functional group.

19. A thermoplastic compound comprising:
(a) from about 1 to about 30 weight percent, by weight of the thermoplastic compound, of an elastomer;
(b) from about 5 to about 50 weight percent, by weight of the thermoplastic compound, of a modified polyolefin polymer comprising a polar functional group;
(c) from about 10 to about 90 weight percent, by weight of the thermoplastic compound, of an unmodified polyolefin polymer;
(d) from 0 to about 30 weight percent, by weight of the thermoplastic compound, of plasticizer;
(e) from 0 to about 10 weight percent, by weight of the thermoplastic compound, of filler; and
(f) from 0 to about 2 weight percent, by weight of the thermoplastic compound, of antioxidant;
wherein the unmodified polyolefin polymer is selected from polypropylene homopolymer, polypropylene copolymer, and combinations thereof;
wherein the modified polyolefin polymer includes one type or multiple types of modified polyolefin polymer and the unmodified polyolefin polymer includes one type or multiple types of unmodified polyolefin polymer; and
wherein each type of the modified polyolefin polymer and each type of the unmodified polyolefin polymer has a Melt Flow Rate;
wherein the one type of modified polyolefin polymer or a combination of the multiple types of modified polyolefin polymer has a Melt Flow Rate (190° C., 2.16 kg) of at least about 100 g/10 min; and
wherein the Melt Flow Rate for the one type of modified polyolefin polymer or the combination of the multiple types of modified polyolefin polymers present in the thermoplastic compound is greater than the Melt Flow Rate for the one type of unmodified polyolefin polymer or the combination of the multiple types of unmodified polyolefin polymers present in the thermoplastic compound.

* * * * *